| United States Patent [19] | [11] Patent Number: 4,457,991 |
| Feldhake | [45] Date of Patent: Jul. 3, 1984 |

[54] SEALANT FOR LITHIUM CELLS

[75] Inventor: Ralph H. Feldhake, Verona, Wis.

[73] Assignee: Rayovac Corporation, Madison, Wis.

[21] Appl. No.: 441,949

[22] Filed: Nov. 15, 1982

[51] Int. Cl.$^3$ ............................................. H01M 2/08
[52] U.S. Cl. ..................................... 429/174; 429/185
[58] Field of Search ................ 429/174, 185, 194, 196

[56] References Cited

U.S. PATENT DOCUMENTS

| 3,713,896 | 1/1973 | Feldhake | 429/174 |
| 3,990,918 | 11/1976 | Bro et al. | 429/185 |
| 4,088,628 | 5/1978 | Bernstein et al. | 260/42.46 |
| 4,129,686 | 12/1978 | Kaduboski | 429/61 |
| 4,223,079 | 9/1980 | Margalit et al. | 429/194 |
| 4,224,736 | 9/1980 | Feldhake | 429/174 X |
| 4,240,197 | 12/1980 | Hamsag | 429/174 X |
| 4,256,815 | 3/1981 | Smilanich et al. | 429/185 |
| 4,282,293 | 8/1981 | van Lier | 429/174 X |
| 4,288,505 | 9/1981 | Joshi et al. | 429/191 |
| 4,292,382 | 9/1981 | Lecerf et al. | 429/197 |

Primary Examiner—Charles F. Lefevour
Attorney, Agent, or Firm—Kenyon & Kenyon

[57] ABSTRACT

A lithium cell having an improved seal. A polymeric grommet sandwiched between a conductive can and cover is wetted with atatic polypropylene. The tacky atatic polypropylene film fills the intersticies between and along the grommet and can components to reduce cell leakage.

5 Claims, No Drawings

SEALANT FOR LITHIUM CELLS

TECHNICAL FIELD

This invention relates to lithium cells in general and more particularly to seals for such cells.

BACKGROUND ART

Lithium is an excellent reducing agent capable of reducing most electrolyte solvents. Accordingly, it is extremely useful in high energy density cells. In particular, lithium anodes have increasingly been employed in small primary cells called "button cells" due to their high volumetric energy densities.

Scores of electrochemical lithium systems have been proposed. For button cell applications, it has been the practice to employ nonaqueous systems employing a lithium anode, an electrolytic solution of a solute and solvent, a cathode, and a separator disposed between the anode and cathode. The entire assembly is, of course, enclosed in a can and cover comprising the "button". For a list of lithium cell components see U.S. Pat. Nos. 4,223,079, 4,288,505 and 4,129,686.

Lithium cells are normally sealed with a polymeric insulating grommet disposed at the interface formed by the can and cover. Traditionally, polypropylene grommets which are inert in the presence of the various electrolytes have been used. See U.S. Pat. Nos. 3,990,918 and 4,292,382.

Unfortunately, sealing lithium cells with polymeric grommets requires the parts to mate together perfectly if a non-leaking closure is to be established. As anyone involved with mass production techniques knows, the vagaries of the production line makes such an accomplishment extremely difficult to obtain. U.S. Pat. No. 3,990,918, listed above, attempts to solve this problem by the utilization of a plastic grommet combined with an elastomeric seal. Another method is the application of bitumin to the grommet.

The importance of a good seal cannot be overemphasized inasmuch as the cell must be protected from: (1) drying out and (2) the introduction of moisture into the cell. Lithium and water, when in contact with one another, violently react creating a dangerous condition which cannot be tolerated in a button cell. Accordingly, it is desirable to develop a simple and convenient lithium cell seal and method of applying it.

SUMMARY OF THE INVENTION

Accordingly, there is provided a lithium cell having a grommet coated with atactic polypropylene. The instant invention results in a sound, leak-resistant seal between the can and cover.

PREFERRED MODE FOR CARRYING OUT THE INVENTION

The instant invention contemplates light metal, nonaqueous primary cells and, in particular, lithium cells.

As was stated hitherto, a button cell consists of a conductive can, a cathode, an anode, a separator disposed between the cathode and anode, a conductive cover and a sealing/insulating grommet. The can is usually crimped about the cover sandwiching the grommet therebetween. The grommet serves to prevent electrolyte leakage and insulate the cover from the can.

It has been found through experience that a plastic grommet closure may tend to allow the button cell to leak, regardless of how tight the crimping forces are. Inasmuch as the can and cover do not always mate perfectly, interstitial leakage may result. The electrolyte, in its inexorable search for oxygen will slowly flow through the tiny surface irregularities found between and along the grommet and the can and cover. Moreover as U.S. Pat. No. 3,990,918 more fully points out, grommets tend to cold flow, thereby contributing to the leakage problem. However, contrary to the tack taken by U.S. Pat. No. 3,990,918, the instant invention does not employ a second grommet or ring.

The instant invention utilizes a sealing grommet resistant to electrolytic attack. It has been found that the polyolefin family of polymers and especially polypropylene ($C_3H_6$) is an excellent material. Polypropylene grommets exhibit a high modulus of elasticity and are rigid and inert.

The grommet is, in turn, coated with atactic polypropylene. Atatic polypropylene is amorphous in that it does not exhibit a crystalline structure. As a consequence, it is tacky and sticky. Moreover, atactic polypropylene is generally not soluble in the solvents normally found in button cells in general, and in lithium cells, in particular.

The physical characteristics of atactic polypropylene allow it to tightly bond to the grommet and the cell and can. Essentially the bonding surfaces are prewetted by the atactic polypropylene, so that upon closure, the electrolyte cannot wet the sealing surfaces and escape the confines of the cell. A series of atactic polypropylenes are available from Hercules Incorporated (Wilmington, DE) under their trademark A-FAX.

The atactic polypropylene, which has a limited solubility at room temperatures (one of the reasons why it is a good actor), is softened at about 50°–60° C. and applied to the grommet in a solution made from toluene ($C_7H_8$) or a water emulsion. The coated grommet is then dried to leave a sealant film on the grommet. The thusly treated grommet is then inserted into the can in the usual manner.

As an alternative embodiment, the atactic polypropylene may be applied directly to the can and/or cover before the grommet is inserted into the can. In this manner every surface is wetted by the atactic polypropylene.

Finally, in order to increase the tacky nature of the atactic polypropylene, selected amounts of bitumin may be added to the solution coating. A "super tacky" grommet may be useful in certain circumstances.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved button cell, the cell including a conductive can and cover, anodic material, cathodic material, an electrolyte, a separator interposed between the anodic material and the cathodic material, and a sealing grommet disposed between the can and cover, wherein the improvement comprises the grommet coated with atactic polypropylene.

2. The cell according to claim 1, wherein the anodic material comprises lithium.

3. The cell according to claim 1 wherein the container is wetted with atactic polypropylene.

4. The cell according to claim 1, wherein the cover is wetted with atactic polypropylene.

5. The cell according to claim 1 wherein the atactic polypropylene coating includes bitumin.

* * * * *